United States Patent [19]

Muramatsu

[11] Patent Number: 4,805,199
[45] Date of Patent: Feb. 14, 1989

[54] PULSE GENERATING CIRCUIT

[75] Inventor: Kikuo Muramatsu, Itami, Japan

[73] Assignee: Mitsubishi Denki Kabushiki Kaisha, Tokyo, Japan

[21] Appl. No.: 144,893

[22] Filed: Jan. 13, 1988

[30] Foreign Application Priority Data

Sep. 14, 1987 [JP] Japan ............... 62-230617

[51] Int. Cl.$^4$ .............. H03K 3/02; H03K 21/36
[52] U.S. Cl. ................... 377/39; 377/55; 377/56
[58] Field of Search ............. 377/39, 55, 56; 328/58, 328/61, 63; 307/265

[56] References Cited

U.S. PATENT DOCUMENTS

| | | | |
|---|---|---|---|
| 3,621,403 | 11/1971 | Seiy | 377/39 |
| 3,629,710 | 12/1971 | Durland | 377/39 |
| 3,836,858 | 9/1974 | Kitano | 377/39 |
| 3,937,932 | 2/1976 | Ahlgren | 377/39 |
| 4,275,354 | 6/1981 | Suematsu et al. | 328/61 |
| 4,326,247 | 4/1982 | Chamberlain | 364/200 |
| 4,330,571 | 5/1982 | Swain | 328/61 |
| 4,365,202 | 12/1982 | Sinniger | 377/39 |
| 4,700,367 | 10/1987 | Kawazoe et al. | 377/39 |
| 4,756,013 | 7/1988 | Van Veldhuizen | 377/39 |

FOREIGN PATENT DOCUMENTS 47-38659  9/1972 Japan.
50-12055  3/1975 Japan.
0182924 10/1983 Japan ............... 377/39

Primary Examiner—John S. Heyman
Assistant Examiner—Tai V. Duong
Attorney, Agent, or Firm—Townsend & Townsend

[57] ABSTRACT

A pulse generating circuit which, when a counting value of a counter and a value previously set at a register are coincident with each other, converts an output into the preset level to thereby generate each elementary pulse, and is provided with a register buffer for storing therein a value for defining the time, when the level of the pulse output is reconverted so that when the level of the pulse signal is converted, the stored value of the register buffer is set in the register through no software to thereby eliminate the influence on software processing with respect to the elemental pulse width, and is provided with a counter buffer for storing therein a counting start value to be set at the counter in addition to the above-mentioned construction so that the value is constructed to be desirably changeable to thereby enable the counting start value of the counter to be changeable each time the overflow occurs, thus enabling the cycle duration of the pulse signal to be changed with ease.

4 Claims, 7 Drawing Sheets

PULSE GENERATING CIRCUIT

BACKGROUND OF THE INVENTION

1. Field of the Invention

The present invention relates to a pulse generating circuit, and more particularly to a pulse signal generating circuit built in a microcomputer system and generating a pulse signal as an output signal from the system.

2. Description of the Prior Art

The pulse signal alternately generating a high level signal and a low level signal is used as various control signals for, for example, an actuator by, for example, PWM (Pulse Width Modulation).

FIG. 1 is a block diagram exemplary of a conventional pulse generating circuit housed in a one-chip microcomputer for mainly carrying out the real time processing, which is disclosed in the U.S. Pat. No. 4,326,247.

In FIG. 1, a reference numeral 1 designates a CPU (Central processing unit) at the microcomputer, which outputs various data signals to a data bus 3 and introduces data therefrom.

A reference numeral 2 designates a counter, which is connected with the CPU 1 through the data bus 3. The counter 2 is given at a clock terminal CK thereof clock as a counting object, generated at a clock generating circuit 4 to be discussed later, and also starts counting from zero, for example, so that the counted value, whenit reaches a predetermined value, overflows to be reset zero and sends a predetermined signal to the CPU 1.

A reference numeral 4 designates a clock generating circuit, which generates clock pulse, being a basic action of the micro computer, and gives it to the CPU 1 and counter 2 through a clock line 5.

A reference numeral 6 designates a comparison value register, which is connected to the CPU 1 through the data bus 3. The comparison value for defining the time for converting a level of output pulse is set at the comparison value register 6 by the CPU 1.

A reference numeral 7 designates a digital comparator. The digital comparator 7 is given at a first input a counting value of the counter 2 and at a second input the comparison value set in the aforesaid comparison value register 6, and compares both the digital inputs, and outputs a coincidence signal CO to a port buffer 8 when both the inputs are conincident with each other.

At the port buffer 8 is set by the CPU 1 the data signal, that is, a logical "1" or "0", corresponding to the high level or the low level signal of the pulse output to be lastly outputted, and the port buffer 8, when given the coincidence signal CO from the aforesaid digital comparator 7, gives the set data signal to an output latch circuit 9.

The output latch circuit 9 latches the data signal given from the port buffer 8 and feeds it to an output terminal OT, which outputs an output level of pulse signal, that is, the high or low level signal, corresponding to the data signal.

Explanation will be given on operation of the conventional pulse generating circuit with reference to the timing chart in FIG. 2.

The counter 2 always counts the clock signals given from the clock generating circuit 4 and increments the counting value one by one per one clock, the counting value of counter 2, as shown in the upper half of FIG. 2, repeats the operation such that the value increases from zero to the predetemined value so as to overflow and the counting value is reset to zero.

For example, when the output pulse from the output terminal OT is at a low level as shown in the left end of FIG. 2, in order to define the time (T23 in FIG. 2) when the output pulse from the output terminal OT is to be converted to a high level, the comparison value is set at the comparison value register 6 through the data bus 3 from the CPU 1(the timing of T21 in FIG. 2). In addition, the comparison value of course is included between the counting value of zero and the overflow value of the counter 2.

Furthermore, in the port buffer 8 is written the data, concretely a logical "1", for defining the level of pulse to be outputted after the level conversion time T23 of the output pulse defined by the aforesaid comparison value (the timing T22 in FIG. 2).

Thus, initialization of the time and level for converting the level of the output pulse is finished. In addition, the initialization is initiated by a signal given to the CPU 1 due to an overflow of the counter 2.

After the aforesaid initialization, when the counting value of counter 2 reaches the comparison value set at the comparison value register 6 (the timing T23 in FIG. 2), the digital comparator 7 detects coincidence of both the values so as to give a coincidence signal CO to the port buffer 8. Hence, the data "1" written in the port buffer 8 is latched by the output latch circuit 9 and a high level signal corresponding to the data is outputted from an output terminal OT, in other words, the output pulse from the output terminal OT is converted from the low level to the high level.

The conventional pulse generating circuit, which is constructed as above-mentioned, has several problems as follows:

Generally, the pulse signal requires variation in its cycle period and pulse width (duty), in both of which the conventional pulse generating circuit is problematical.

The first problem is that it is required for converting the level of pulse output to inevitably write the comparison value in the comparison value register 6 and the data in the port buffer 8 prior to the time to carry out the level conversion, as shown in FIG. 2. Since these processings both are excecuted in a software manner by the CPU 1, the time required for the execution depends on the program processing speed of CPU 1. Accordingly, when the pulse signal, after converted from one level to the other, is converted again to the one level, a time over a certain extent is required. In other words, a width of pulse outputted from the output terminal OT cannot be smaller than the sum of the time needed for writing the comparison value in the comparison value register 6 by the CPU 1 and the time needed for writing the data in port buffer 8. More concretely, for example in FIG. 3, when the comparison value V31 is written in the comparison value register 6 at the timing T31 and the data "1" in the port buffer 8 at the timing T32, the level of pulse is converted from the low to high at the timing T33. Thereafter, even when the level of pulse output is immediately again converted to the low level, the write-in of comparison value V32 in the comparison value register 6 is completed at the timing T34, and that of data "0" in the port buffer 8, at the timing T35. Hence, it is impossible before the timing T35 to convert the pulse output to the low level. In other words, the time duration, that is, the pulse width, in which the level conversion, after the level is converted from one level to the other, is carried out again to the one level, cannot be shorter than a time duration from the timing T33 to T35 shown in FIG. 3.

The second problem is that the counting start value and overflow value of the counter 2 are fixed. Therefore, in a case where the level conversion of the output pulse is carried out at a cycle period different from the one from the counting start of counter 2 until the counter 2 overflows to be reset, it is required to compute at each one cycle period of pulse output the comparison value to be set in the comparison value register 6. Accordingly, when the cycle duration of pulse output is relatively shorter, the overhead time with respect to CPU 1 increases to cause reduction of a throughput of the entire apparatus.

SUMMARY OF THE INVENTION

In the light of the above circumstances, the present invention has been designed. A first object thereof is to provide a pulse generating circuit which can desirably set the smallest width of the pulse output without being restrained by the software processing speed of the CPU.

A second object of this invention is to provide a pulse generating circuit executable of the time duration setting and duty setting of the pulse output without depending on the software by the CPU.

A third object of this invention is to provide a pulse generating circuit which can set the output level of the pulse signal, especially when the high level and low level thereof are repeated, with no necessary depending upon the software.

A pulse generating circuit of this invention being provided with a counter which counts clock and is reset when said clock reaches a predetermined counting value, a register which alternately sets therein a first comparison value for defining the timing of the leading edge of an elementary pulse of a pulse signal to be outputted and a second comparison value for defining the timing of the trailing edge of the same, a digital comparator which compares the counting value of said counter with the comparison value of said register so as to output a coincidence signal when both said values are coincident with each other, and output level storage means which is previously set therein data signals corresponding to the level of a pulse signal to be outputted and which, when given a coincidence signal of said digital comparator, outputs said set data signals, comprises: a register buffer which stores therein said second comparison value to be set to said register, and, when given said coincidence signal from said digital comparator, sets said second comparison value at said register; and a control circuit which allows said register to store therein the first comparison value, said register buffer to store therein the second comparison value, and said output level storage means to store therein said data signal, with respect to each elementary pulse of the pulse signal to be outputted.

The above and further objects and features of the invention will more fully be apparent from the following detailed description with accompanying drawings.

DESCRIPTION OF THE PREFERRED EMBODIMENT

Figure 1:
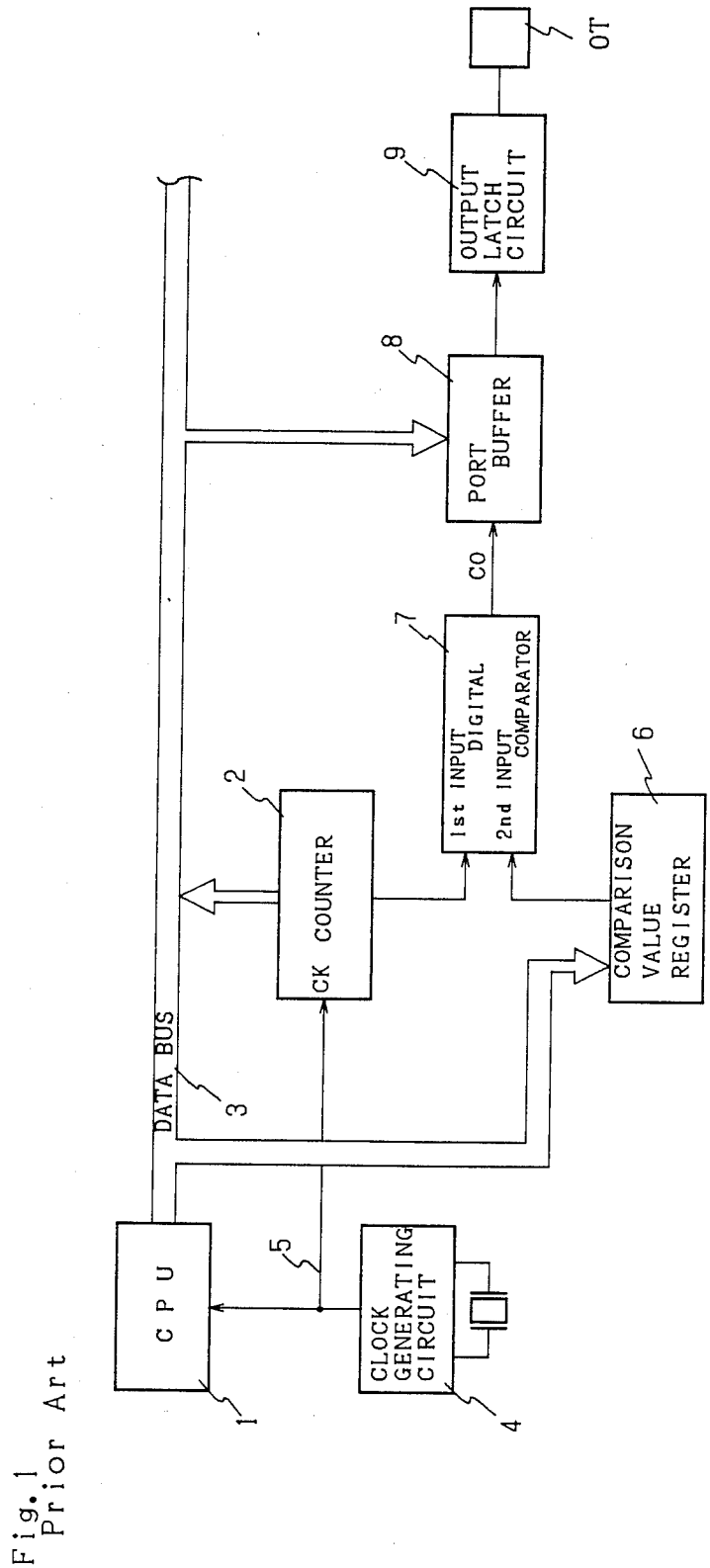
FIG. 1 is a block diagram exemplary of a conventional pulse generating circuit.

Next, the present invention will be detailed on the basis of the drawing showing an embodiment of the invention.

Figure 4:
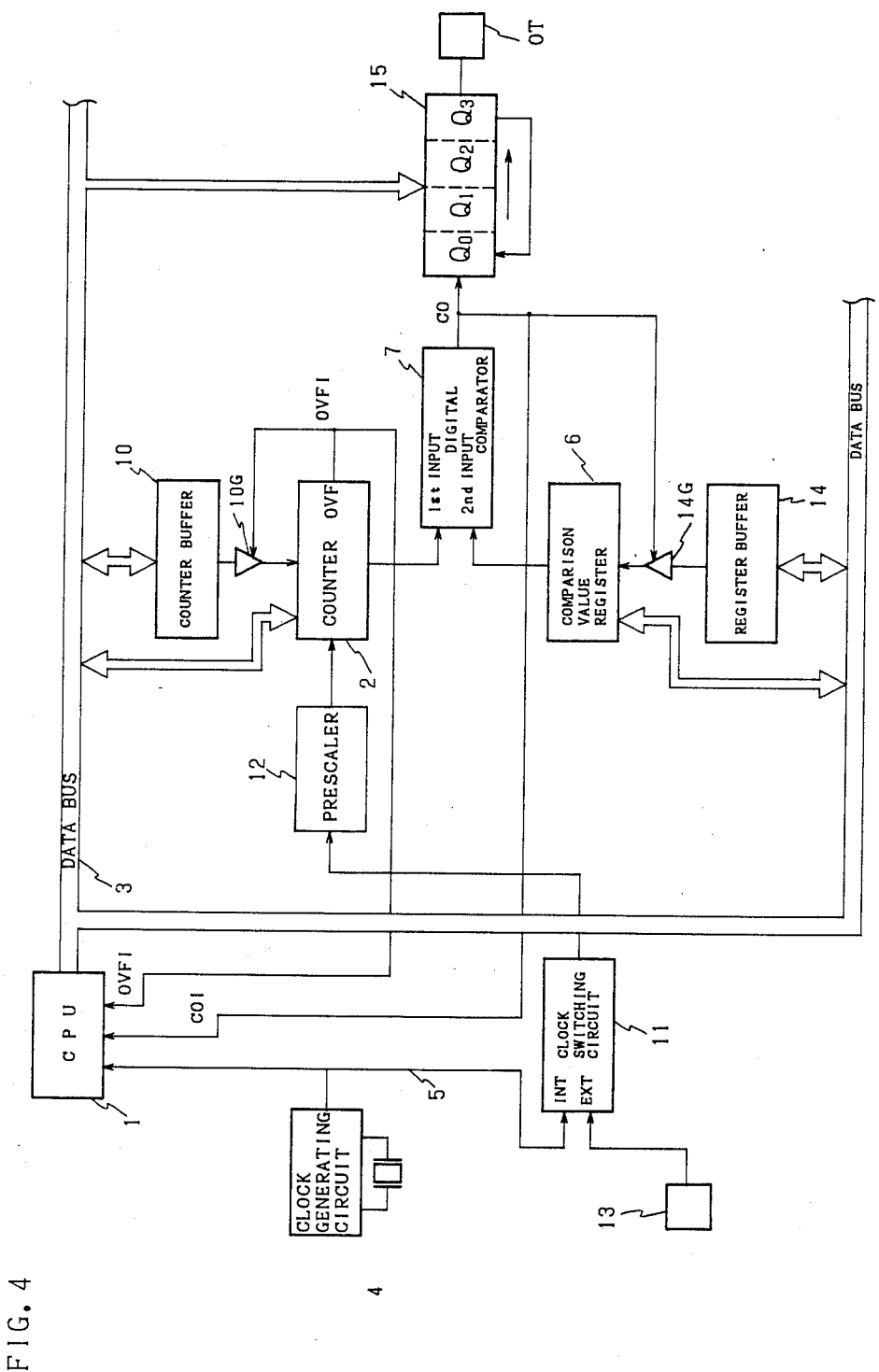
FIG. 4 is a block diagram of an embodiment of a pulse generating circuit of the present invention.

In FIG. 4, the embodiment of the pulse generating circuit of the invention is constructed together with a microcomputer in one chip. In addition, the components of the same as or corresponding to those in FIG. 1 are designated with the same reference numerals.

In FIG. 4, a reference numeral 1 designates a CPU (central processing unit) of the microcomputer, which outputs various data signals to a data bus 3 or introduces them therefrom.

A reference numeral 2 designates a counter, which is connected with the CPU 1 through the data bus 3 and in which a counting start value is set as a reload value by the CPU 1. When the counting value of the counter 2 reaches an overflow value, an overflow interrupting signal OVF1 is outputted from an overflow terminal OVF at the counter 2 and given to a gate 10G and the CPU 1. Also, the counter 2 connects with a counter buffer 10 through the gate 10G so that, when the overflow interrupting signal OVF1 is given to the gate 10G to open it, a value stored in the counter buffer 10 is set in the counter 2 as the reload value.

A reference numeral 4 designates a clock generating circuit, which generates basic clock (internal clock) for this microcomputer and provides it to the CPU 1 and a clock switching circuit 11 via a clock line 5.

A reference numeral 6 designates a comparison value register, which is connected with the CPU1 through the data bus 3 and in which a first comparison value V1 for defining the level conversion time of pulse signal is set by the CPU 1. Also, the comparison value register 6 is connected through a gate 14G to a register buffer 14 to be discussed later so that when the coincidence signal CO outputted from a digital comparator 7 to be discussed later opens the gate 14G, the second comparison value V2 stored in the register buffer 14 is set to the register 6.

The digital comparator 7 is given at a first input the counting value of the counter 2 and at a second input the first comparison value V1 or the second comparison value V2 set at the comparison value register 6. Also, the digital comparator 7 compares both the digital inputs, and outputs the coincidence signal CO when they are coincident with each other, the coincidence signal CO being supplied as a shift clock signal to a looped shift register 15 to be discussed later, to the gate 14G as a control signal therefor, and to the CPU 1 as a comparison result interrupting signal CO1.

The looped shift register 15 is composed of, for example, four stages Q0 to Q3 in the embodiment of the invention, in which the data signal, that is, a logical "1" or "0" corresponding to the high level or low level signal of pulse signal to be outputted is set in each stage, for example, alternately by the CPU 1. The shift register 15 gives a value at one of the four stages to the output terminal OT, so that each time the shift register 15 is given the coincidence signal CO as the shift clock from the aforesaid digital comparator 7, the content of the respective stages Q0 to Q3 are shifted one by one in a looped manner to thereby give the content of new stage to the output terminal OT.

The clock switching circuit 11 is given at its internal clock terminal INT the clock outputted from the clock generating circuit 4 and at its external clock terminal EXT the clock given to the clock input terminal 13 from an external clock generating circuit (not shown), and supplies either the internal clock or the external clock to a prescaler 12.

The prescaler 12 is a frequency divider, which divides the inputted clock into the frequency to be required by the counter 2, thereby outputting the divided frequency to the counter 2.

Figure 2:
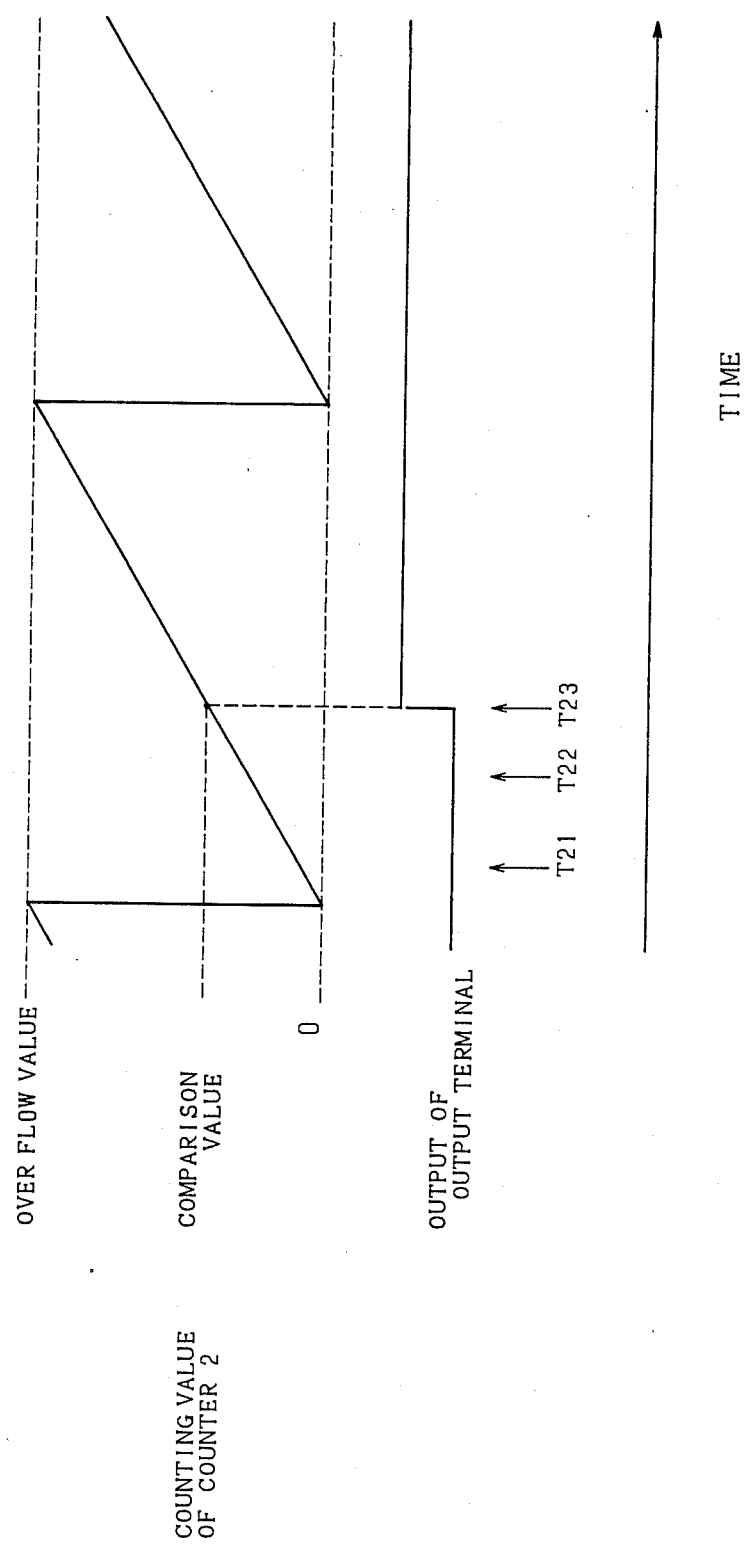
FIGS. 2 and 3 are timing charts explanatory of operation of the conventional pulse generating circuit.
Figure 3:
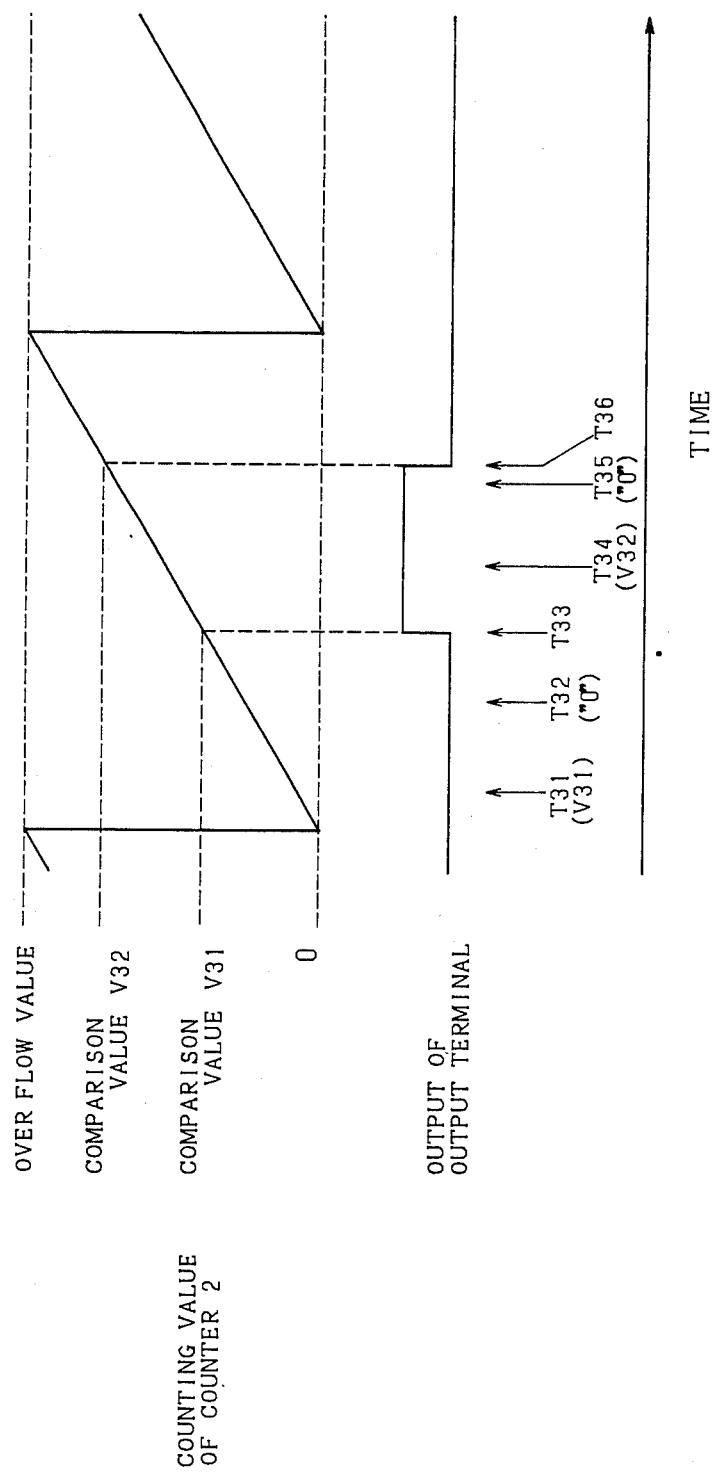

Next, explanation will be given on operation of the above-mentioned pulse generating circuit of the invention with reference to the timing chart in FIG. 5. In addition, the timing chart in FIG. 2 shows the case where the reload value of counter 2 is fixed to N and not to be changed.

At the counter 2 is set by the CPU 1 the counting start value as an initial value, the reload value being set at the counter buffer 10. The counter 2 counts the clock always given from the prescaler 12, the counting value being incremented one by one per a clock. The counting value of counter 2, as shown in the upper half of FIG. 5, rises from the reload value N to the overflow value and overflows, at which time the overflow interrupting signal OVF1 outputted from the counter 2 is given to the gate 10G, so that the counter 2 is reloaded with a new reload value (fixed to the constant value N in FIG. 5) from the counter buffer 10, thereby repeating the operation to the reload value.

Accordingly, the counting cycle duration of counter 2 is the duration that the reload value is reloaded to the counter 2 from the CPU 1 at the initial state and thereafter from the counter buffer 10 so that the counter 2 itself overflows, the cycle duration also being a basic duration of the pulse generating circuit of the invention.

Incidentally, the overflow interrupting signal OVF1 outputted when the counter 2 overflows is given also to the CPU 1, whereby the CPU 1 computes a reload value of counter 2 to be set to the counter buffer 10 when required to be changed, and writes the result of computation in the counter buffer 10.

Figure 5:
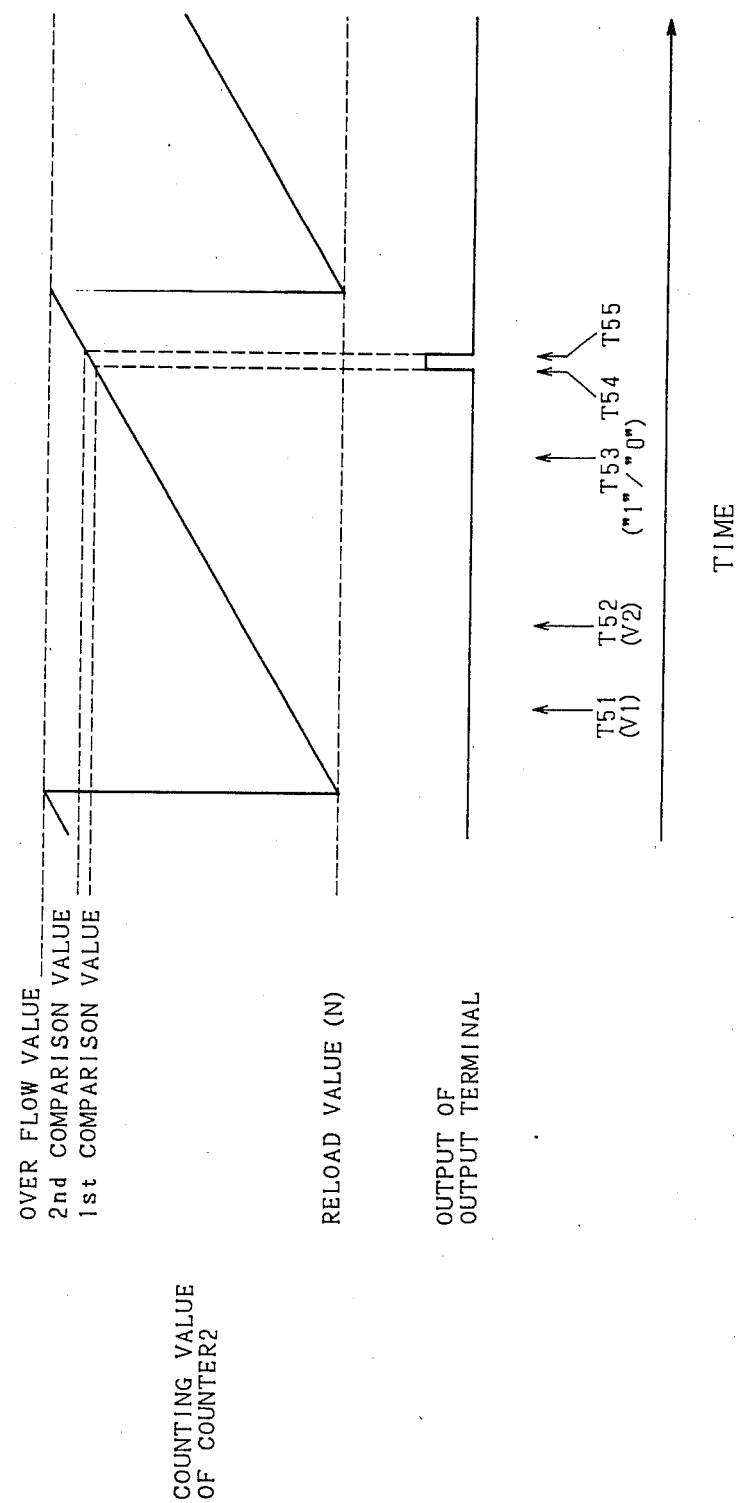
FIGS. 5, 6 and 7 are timing charts explanatory of operation of the embodiment shown in FIG. 4.

Now, for example, when the pulse output from the output terminal OT is at a low level for the initial time as shown in FIG. 5, the shift register 15 sets at the stage Q3 a logical "0". In order to define the time (T54 in FIG. 5) when the output pulse from the output terminal OT is to be converted to have a high level, the first comparison value V1 is set directly to the comparison value register 6 from the CPU 1 through the data bus 3 (the timing T51 in FIG. 5), the comparison value V1 of course being included between the reload value N of counter 2 and the overflow value.

At the register buffer 14, the second comparison value V2 is set from the CPU 1 to the register buffer 14 through the data bus (the timing T52 in FIG. 5) in order to define the time when the level of the pulse from the output terminal OT converted by the first comparison value V1 is converted again to the low level, the second comparison value V2 of course being included between the reload value N of counter 2 and the overflow value.

Furthermore, in the shift register 15 are written the data, concretely a logical "1" or "0" ("1" in the case of FIG. 5), to define the level of pulse to be outputted after the timing T54 of converting the level of output pulse defined by the aforesaid first comparison value V1, and the data, concretely a logical "1" or "0" ("0" in the case of FIG. 5), to define the level of pulse to be outputted after the timing T55 of converting the level of output pulse defined by the aforesaid second comparison value V2 (the timing T53 in FIG. 5).

Thus, the initial setting for level conversion of the output pulse finishes.

The internal clock (generated by the clock generating circuit 4) or the external clock(generated by an external clock generating circuit (not shown)) is supplied to the prescaler 12 through the clock switching circuit 11, the prescaler 12 frequency-dividing the input clock to the frequency required for the counter 2, the divided clock being given to the counter 2.

When the counting value of counter 2 reaches the comparison value set at the comparison value register 6 (the timing T54 in FIG. 5), the coincidence signal CO is outputted from the digital comparator 7. Since the coincidence signal CO is given as the shift clock to the shift register 15, the shift register 15 is shifted by one stage so that data "1" written in the stage Q2 is outputted. The data "1" is given to the output terminal OT, whereby a high level signal corresponding to the data "1" is outputted from the output terminal OT is converted from the low level to the high level.

The coincidence signal CO outputted from the aforesaid digital comparator 7 is given also to the gate 14G as the control signal therefor. Hence, the gate 14G is opened so that the second comparison value V2 stored in the register buffer 14 is set to the comparison value register 6.

At the time when the counting value of the counter 2 reaches the second comparison value V2, the counting value of the counter 2 and the content of the comparison value register 6 again coincide with each other, whereby the digital comparator 7 again outputs the coincidence signal CO. Hence, in the same as abovementioned, the shift register 15 is shifted by one more stage to output the content ("0") of the stage Q1, whereby the output pulse from the output terminal OT is converted to the low level.

Accordingly, a high level duration of pulse output, in other words, a pulse width is an interval between the timing T54 and T55, but no software processing by the CPU 1 exists there between. In other words, the time duration between the timings T54 and T55 can be reduced to one cycle duration of the clock as the counting object for the counter 2. In more detail, the prescaler 12 moderately divides in frequency the internal clock or the external clock, whereby the minimum pulse width of output pulse from the output terminal OT is controllable.

In addition, the coincidence signal CO is secondly outputted from the digital comparator 7, whereby the comparison value V2 is again given from the register buffer 14 to the comparison value register 6 and set therein, so that when the time for the next high level output is set, a new first comparison value is written from the CPU 1 directly in the comparison value register 6.

Figure 6:
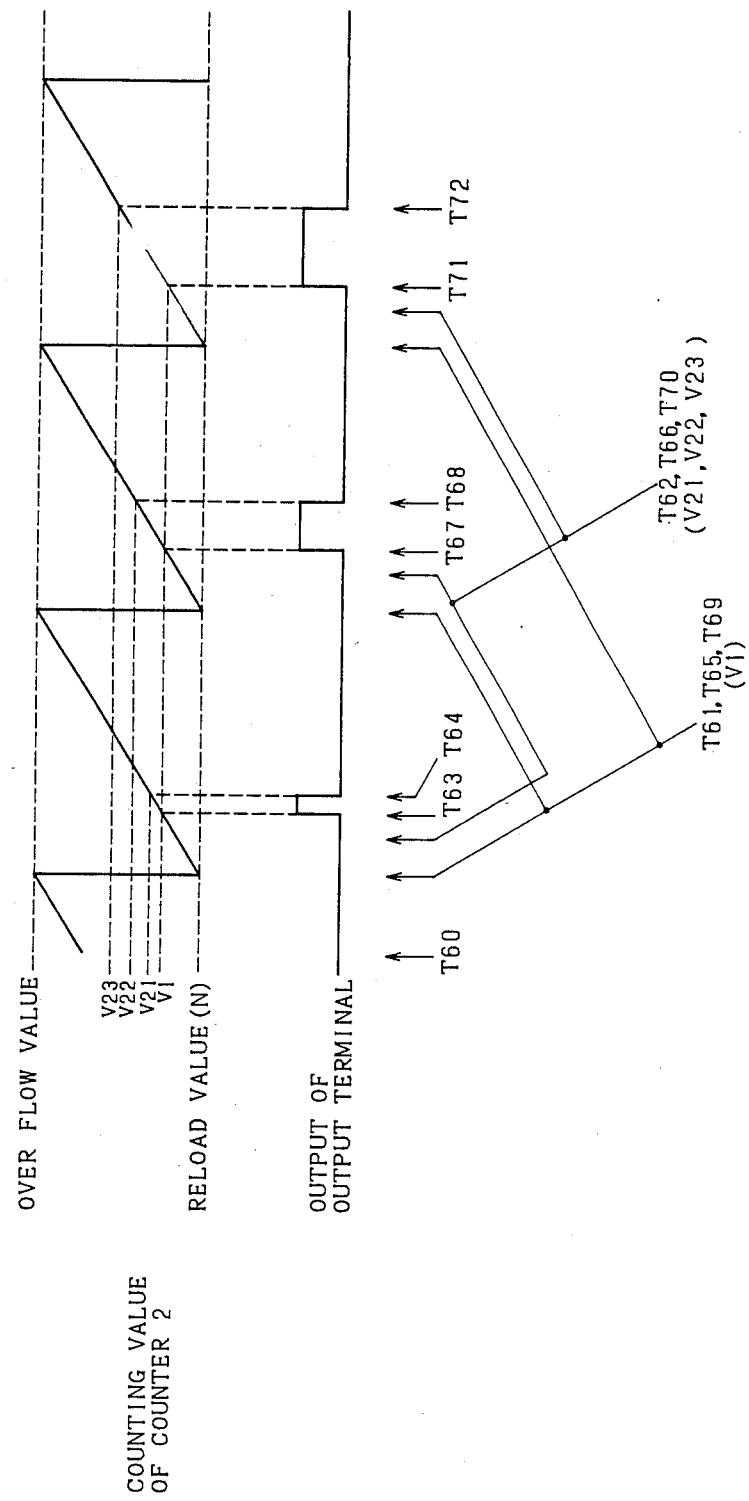

FIG. 6 is a timing chart of the case where the pulse is repeatedly outputted while changing the duty such as PWM.

In the embodiment shown in FIG. 6, the reload value N for the counter 2 and the first comparison value V1 to the comparison value register 6 are made constant and the second comparison value to the register buffer 14 is changed to gradually increase as V21, V22 and V23. In other words, firstly, at the timing T60 data of, for example, (Q0, Q1, Q2, Q3)=("1", "0", "1", "0") is written in the shift register 15 so that the high level output and low level output alternately appear. The CPU 1 writes the first comparison value V1 into the comparison register 6 corresponding to the overflow interrupting signal OVF1 given when the counter 2 overflows (the timings T61, T65 and T69 in FIG. 6) and the comparison values V21, V22 and V23 are sequentially written in the register buffer 14 (the timings T62, T66, T70 in FIG. 6).

Accordingly, the counter 2 repeats the overflow at the same cycle duration (the time required for computing values between the reload value N and the overflow value). The pulse at the high level is generated at the starting points of the timings T63, T67 and T71 of the same counting values (the first comparison value V1) between the respective one overflow, the respective pulse being continued until the timings T64, T68 and T72 where the counting value of the comparison values register 6 coincide with the comparison values V21, V22 and V23 written in the register buffer 14.

Such processing gradually elongates a width of each high level duration of the output pulse, so that a width between the respective high level durations of the pulse output, that is, the duration between the timings T63 and T64, T67 and T68, or T71 and T72, becomes gradually longer.

Figure 7:
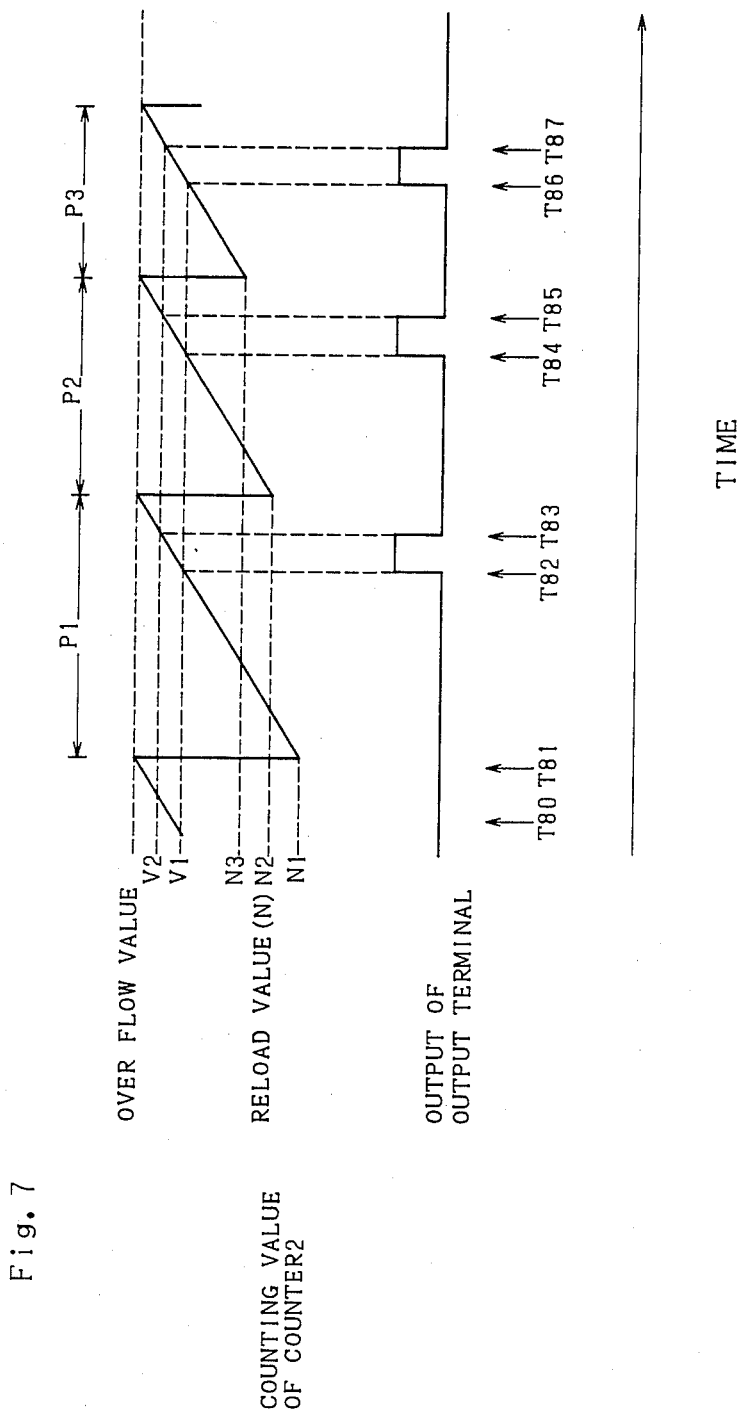

FIG. 7 shows the timing chart in the case where when the CPU 1 changes the reload value to be written in the counter buffer 10. In addition, at this embodiment the first and second comparison values V1 and V2 written in the comparison value register 6 and the register buffer 14 are all made constant.

In other words, at first, at the timing T80 the data of, for example, (Q0, Q1, Q2, Q3)=("1", "0", "1", "0") so as to alternately appear the high level or the low level output, is written in the shift register 15. The CPU 1 writes the first and second comparison values V1 and V2 (both are constant) sequentially at the predetermined timings (not shown in FIG. 7) in the comparison value register 6 and register buffer 14 corresponding to the overflow interrupting signal OVF1 given when the counter 2 overflows.

Also, the CPU 1 writes in the counter buffer 10 the reload values N1, N2, N3 . . . sequentially increased at the predetermined timings T81, T83, T85 and T87 slightly before the respective overflow timings.

Accordingly, the counter 2 repeats the overflow at sequentially decreasing cycle durations (a duration P1 required for counting from the reload value N1 to the overflow value, that P2 from the reload value N2 to the same, and that P3 from the reload value N3 to the same). The pulse at a high level is generated at the timings T82, T84, T86 . . . as the starting-point when the counting value of the counter 2 reaches the first comparison value V1 between the respective overflows at one time. In this case, a duration between the respective start timings and the preceding overflow timing of counter 2 decreases in the order.

Thus, the reload values stored in the counter buffer 10 by the CPU 1 is changed to enable the cycle duration of the output pulse to be changed with ease.

In addition, in the aforesaid embodiment, explanation was given on operation in the case where the reload value set at the counter buffer 10 is made constant so that the first and second comparison values set at the comparison value register 6 and register buffer 14 are changed and on operation in the reverse case where the first and second comparison values set at the comparison value register 6 and register buffer 14 are made constant so that the reload value set at the counter buffer 10 is changed, but it is of course possible to simultaneously change both the values.

Furthermore, the pulse generating circuit of the invention can of course be incorporated in a one-chip microcomputer in the same way as the conventional embodiment and be separately constructed to connect with the CPU for use.

As seen from the above, in the pulse generating circuit of the invention, when the coincidence detection of the digital comparator converts the level of output pulse from one level to the other, a comparison value for defining the time of the next level conversion is given from the register buffer to the comparison value register, whereby the reconversion of the level of output pulse is carried out independently of the processing of CPU as the control circuit. Hence, it is possible to extremely reduce the pulse width, that is, the duty. Also, since the counting start value of the counter for deciding the cycle duration of output pulse can be set every time, the pulse cycle duration can be changed with ease.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A pulse generating circuit being provided with a counter which counts clock and is reset when said clock reaches a predetermined counting value, a register which alternately sets therein a first comparison value for defining the timing of the leading edge of an elementary pulse of a pulse signal to be outputted and a second comparison value for defining the timing of the trailing edge of the same, a digital comparator which compares the counting value of said counter with the comparison value of said register so as to output a coincidence signal when both said values are coincident with each other, and output level storage means which is previously set therein data signals corresponding to the level of a pulse signal to be outputted and which, when given a coincidence signal of said digital comparator, outputs said set data signals, comprises:

a register buffer which stores therein said second comparison value to be set to said register, and, when given said coincidence signal from said digital comparator, sets said second comparison value at said register; and a control circuit which allows said register to store therein the first comparison value, said register buffer to store therein the second comparison value, and said output level storage means to store therein said data signal, with respect to each elementary pulse of the pulse signal to be outputted.

2. A pulse generating circuit as set forth in claim 1, wherein said output level storage means is a shift register in which the storage content is shifted in a looped manner.

3. A pulse generating circuit being provided with a counter which counts clock and is reset when said clock reaches a predetermined counting value, a register which alternately sets therein a first comparison value for defining the timing of the leading edge of an elementary pulse of a pulse signal to be outputted and a second comparison value for defining the timing of the trailing edge of the same, a digital comparator which compares the counting value of said counter with the comparison value of said register so as to output a coincidence signal when both said values are coincident with each other, and output level storage means which is previously set therein data signal corresponding to the level of a pulse signal to be outputted and which, when given a coincidence signal of said digital comparator, outputs said set data signals, comprises:

a register buffer which stores therein said second comparison value to be set to said register, and when given said coincidence signal from said digital comparator, sets said second comparison value is set in said register;

a counter buffer which stores therein a counting start value of said counter for defining each one cycle duration of the pulse signal to be outputted and sets the stored values at said counter when said counter reaches the predetermined value; and a control circuit which allows said register to store therein the first comparison value, said register buffer to store therein the second comparison value, said output level storage means to store therein said data signal, and said counter buffer to store the counting start value, with respect to each elementary pulse of said pulse signal to be outputted.

4. A pulse generating circuit as set forth in claim 3, wherein said output level storage means is a shift register in which the stored content is shifted in a looped manner.

* * * * *